United States Patent [15] 3,641,836
Boggs et al. [45] Feb. 15, 1972

[54] SPINDLE BRAKE ACTUATOR

[72] Inventors: Beryl Aaron Boggs, Chester; Robert Ellis Quinn, Richmond, both of Va.

[73] Assignee: Allied Chemical Corporation, New York, N.Y.

[22] Filed: Nov. 4, 1970

[21] Appl. No.: 86,917

[52] U.S. Cl. .................................................. 74/512, 74/107
[51] Int. Cl. ............................................................. G05g 1/14
[58] Field of Search ........................... 74/491, 512, 107, 539

[56] References Cited

UNITED STATES PATENTS 564,562  7/1896  Holman ............................. 74/491 X
1,795,719  3/1931  Hardison ............................. 74/512
1,911,223  5/1933  D'Aleo ............................. 74/512
2,800,035  7/1957  Miller ............................. 74/491

Primary Examiner—William F. O'Dea
Assistant Examiner—P. D. Ferguson
Attorney—Roy H. Massengill and Richard A. Anderson

[57] ABSTRACT

A spindle brake actuator is disclosed which utilizes force transmitted through a rotating foot lever or brake pedal and integral rotating cam to a traversing cam roller attached to means for transmitting the force to actuate the brake. The lever is locked in actuating position by engaging the traversing cam roller at an acute angle of the cam past center position relative to cam rotation. The actuator is released by kicking a toe plate attached to the cam.

2 Claims, 1 Drawing Figure

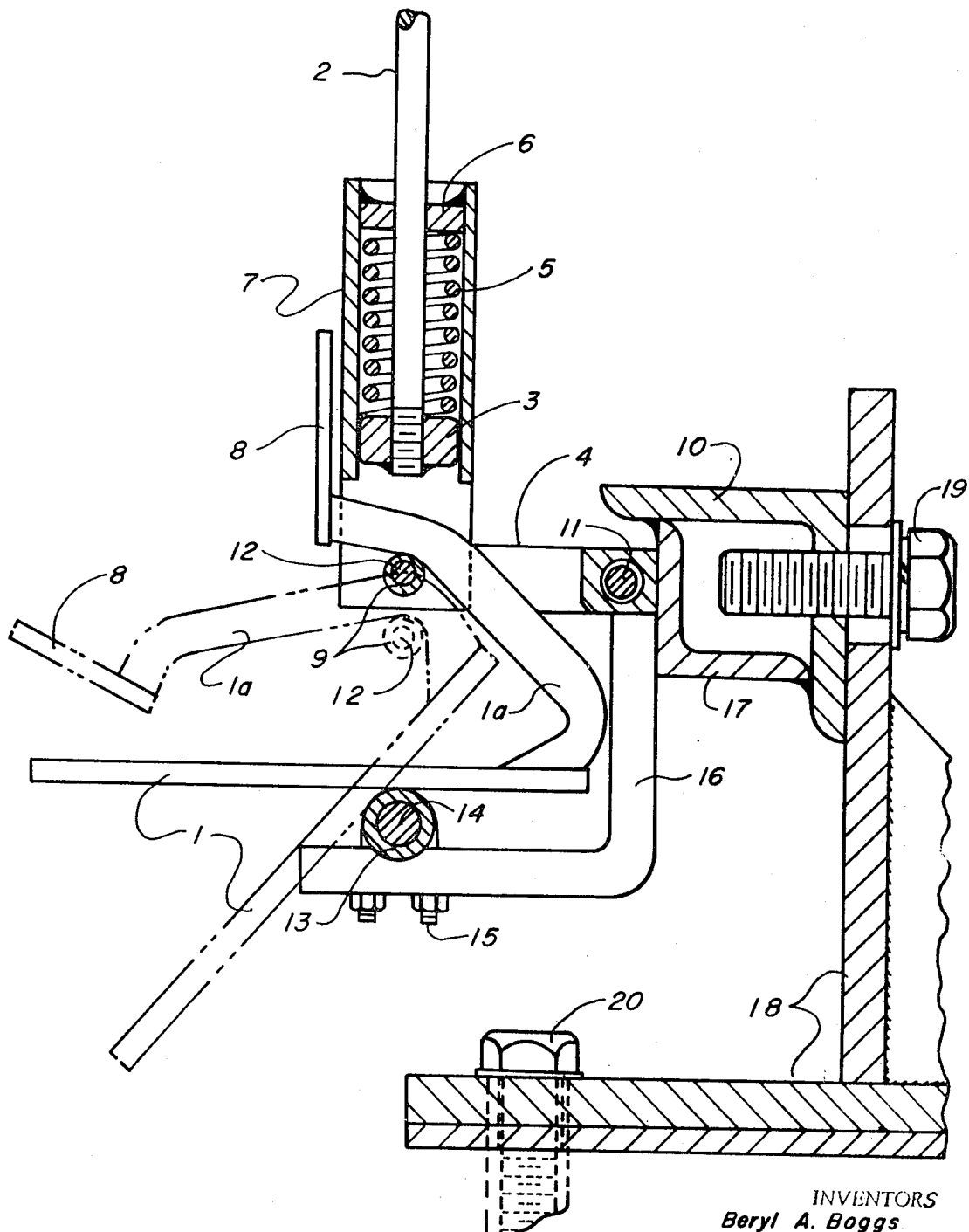
INVENTORS
Beryl A. Boggs
Robert E. Quinn
BY Richard A. Anderson
ATTORNEY

SPINDLE BRAKE ACTUATOR

BACKGROUND OF THE INVENTION

This invention relates to a spindle brake actuator for yarn spindles.

U.S. Pat. No. 3,166,882 to Stahlecker discloses several foot-operated devices for stopping spindles. The subject actuator differs from those described in the Stahlecker patent in that force is transmitted through a rotating foot lever and integral rotating cam to a traversing cam roller.

SUMMARY OF THE INVENTION

THis invention is a spindle brake actuator which utilizes force transmitted to a rotating foot lever or brake pedal with integral rotating cam to a traversing cam roller attached to means for transmitting force to actuate the brake. The lever is locked in actuating position by engaging in the traversing cam roller at an acute angle of the cam past center position relative to cam rotation. The actuator is released by kicking a toe plate attached to the cam. The design features excellent reliability, long maintenance-free life, and safety.

BRIEF DESCRIPTION OF DRAWING

The drawing is a side elevation with partial cross sections showing the preferred embodiment of the spindle brake actuator of this invention.

DESCRIPTION OF THE PREFERRED EMBODIMENTS

The preferred embodiment of the spindle brake actuator of this invention is shown in the drawing. Referring to the drawing, brake pedal 1 has an integral rotating cam 1a and toe plate 8. Brake pedal 1 is rotatably mounted on pivot rod mounting plate 16 which is rigidly connected to angle 17 which is, in turn rigidly connected to angle 10 and stationary pedal support 18. Integral rotating cam 1a movably contacts traversing cam roller 9 which is rotatably mounted on a pivot rod 12. Pivot rod 12 is rigidly mounted in movable housing 7 which houses spring 5. Spring 5 contacts plate 6 which is rigidly mounted in housing 7 and has an oversize orifice to permit passage of rod 2. Spring 5, at the opposite end from plate 6, contacts plate 3 which is slidably mounted in housing 7, and rigidly connected to rod 2. Housing 7 is supported by bracket 4 which is rotatably mounted on angle 17, thus, housing 7 is movable toward brake pedal 1. Integral rotating cam 1a has contacting surfaces formed in an acute angle. To actuate the brake, not shown, rod 2 must move toward brake pedal 1. This is accomplished by pushing brake pedal 1 into the actuating position, shown by the phantom lines on the drawing, by pushing on the protruding portion of brake pedal 1 so that it rotates about pivot rod 14 in tubing 13 which is rigidly connected to brake pedal 1. Pivot rod 14 is rigidly mounted on pivot rod mounting plate 16 with clamp 15. In actuating position, integral rotating cam 1a moves pivot rod 12 toward brake pedal 1 within traversing cam roller 9 which is free to rotate to the position shown in phantom. Pivot rod 12 is rigidly mounted through orifices, not shown, in housing 7. So as pivot rod 12 moves into actuating position, housing 7 must also move toward brake pedal 1. Thus, rigidly mounted plate 6, in housing 7 pushes spring 5 against plate 3 which is in turn connected to rod 2, but free to move in housing 7. Thus, rod 2 moves toward brake pedal 1 to actuate brake, not shown. The brake is released by pushing toe plate 8. Bracket 4 holds housing 7 but is free to rotate about pivot rod 11, by means not shown. Bracket 4 is mounted on angle 17, which is in turn rigidly mounted on angle 10, attached to pedal support 18 by bolt 19. Pedal support 18 is mounted on a stationary structural member, not shown, by bolt 20.

In use, the brake actuator is connected to the lever of spindle brake at rod 2. This spindle can be used to wind textile yarns. Typical of such brakes for yarn spindles are the ones disclosed in U.S. Pat. Nos. 3,116,590 and 3,166,883, to Meadows.

We claim:

1. A spindle brake actuator comprising a brake pedal having an integral rotating cam, said integral rotating cam having the contacting surfaces formed in an acute angle said brake pedal rotatably mounted on a support means, said brake pedal integral rotating cam movably contacting a traversing cam roller, said traversing cam roller rotatably mounted on a pivot rod, said pivot rod rigidly mounted in a movable housing having a spring therein, said housing being supported by a bracket rotatably mounted on support means, said spring contacting a plate rigidly mounted within said housing at one end and the other end of said spring contacting a plate slidably mounted within said housing, and said slidably mounted plate being rigidly connected to a rod which actuates a spindle brake, so that said brake pedal is locked in actuating position by engaging the traversing cam roller at an acute angle of the integral rotating cam contacting surfaces past center position relative to cam rotation.

2. The spindle brake actuator of claim 1 wherein said brake pedal also has an integral toe plate.

* * * * *